Dec. 30, 1969   R. B. ASHMAN   3,486,522
TIRE VALVE CORE
Filed Dec. 11, 1967

INVENTOR.
Robert B. Ashman
BY
ATTORNEY.

United States Patent Office 3,486,522
Patented Dec. 30, 1969

3,486,522
TIRE VALVE CORE
Robert B. Ashman, New York, N.Y., assignor to Scovill Manufacturing Company, Waterbury, Conn., a corporation of Connecticut
Filed Dec. 11, 1967, Ser. No. 689,677
Int. Cl. F16k *15/20, 25/00*
U.S. Cl. 137—234.5    3 Claims

ABSTRACT OF THE DISCLOSURE

In a "short" valve core, a guide washer centers the lower end of the pin and still permits high flow rates. The valve is swivelly attached to the lower end of the pin.

---

This invention relates to a valve core for a pneumatic tire. More specifically, this invention relates to a so-called "short" valve core with especially effective means for centering the valve plunger and for assuring proper seating of the valve.

In the prior art there are a number of patents which disclose valve cores of the "short" type which provide in a relatively short space of valve stem, a valve element for a pneumatic tire. One such valve is shown in the U.S. Patent 3,247,882. However, prior devices have not been satisfactory in that they have not afforded in positioning of the valve packing, an accuracy which has assured a proper seating on the valve seat. Also, such prior stiuctures have not permitted the flow rates of the more open "long" core structures.

The present invention has for an object, means in a short valve core by which the proper seating of the valve element on the valve barrel is assured.

Another object of the invention is to provide a "short" core having an improved fill rate.

Another object of the invention is to provide a "short" core having a simple and inexpensive structure including a one-piece barrel.

Further objects of the invention will be apparent from the following specification, including drawings, wherein.

Figure 2:
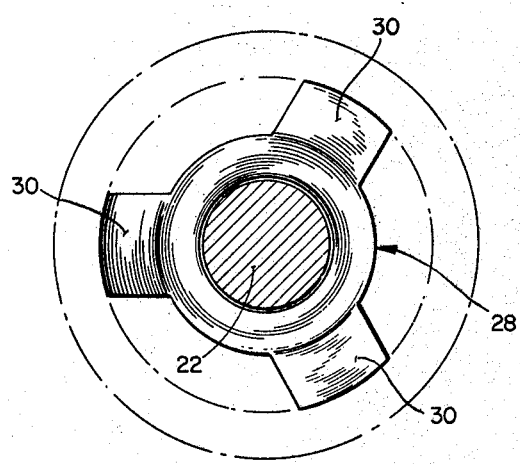
FIG. 2 is a sectional view taken along the line 2—2 of FIG. 1.
Figure 1:
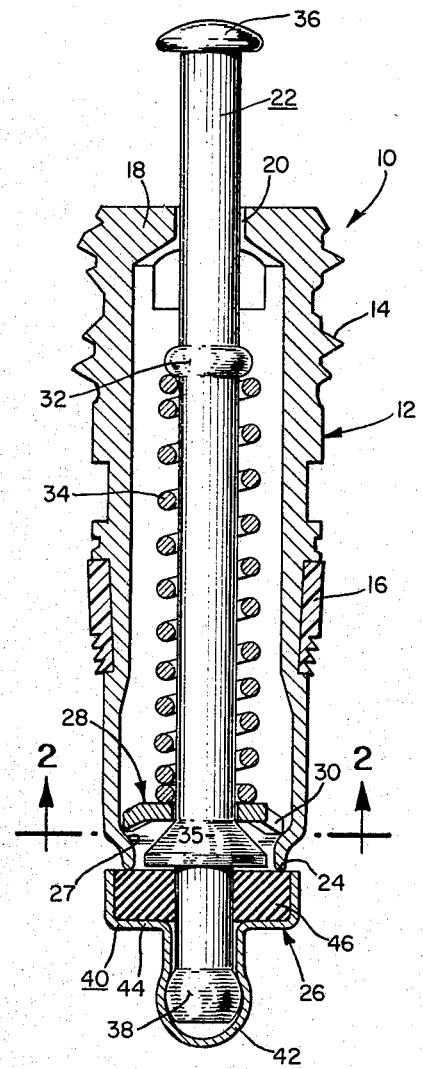
FIG. 1 is a sectional view of a core embodying the invention.

Referring more specifically to the drawings, a valve core embodying the invention is generally designated 10 in FIG. 1. It includes a body or barrel 12 having a threaded exterior as at 14 and provided with an annular gasket or cuff 16 of Teflon or the like as described in the U.S. Patent 2,932,531 to Briechle, and which seals the barrel to the wall of the valve stem. The barrel, which is of simple one-piece construction, is equipped at its upper end with a flattened tool-engaging projection or bridge 18 having a central opening 20 therethrough for accommodation of the pin 22 of the check valve.

The inner or entering end of the plug or barrel 12 is reduced in diameter and formed with a valve seat 24 for engagement by the check valve 26. A shoulder 27 is formed on the inside of the barrel adjacent the seat. As shown, the shoulder 27 angles down as the center of the barrel is approached.

Surrounding the pin 22 with slight clearance are open guide means comprising a guide washer 28 which has radially outstanding legs 30. As shown in FIG. 1, these legs angle downward and their distal ends engage the wall of the barrel at the shoulder 27. The legs are open, that is, well spaced, to permit high air flow therebetween. The downward incline of the legs 30 serves to reduce resistance to the flow of air by funnelling the air out to a diameter where the opening is greater.

Intermediate its ends, the pin 22 is formed with the annular enlargement 32 and an axial spring 34 surrounds the pin, engaging both the enlargement 32 and the washer 28. The spring is under compression and urges the pin 22 upward to seat the valve 26 on seat 24. The angled shape of the shoulder 27 causes centering of the washer 28 as the washer is urged downward by the spring 34.

Downward of the pin from the washer 28 in FIG. 1, is a conical upwardly tapered outward flange 35. The flanged 35 upon depression of the pin 22, assures the detachment of the packing 46 from the seat 24 should the packing 46 become semi-vulcanized to the seat 24 in a long period under pressure.

The upper end of the pin 22 is formed with a conventioinal head 36, while the lower end is formed with an enlarged rounded head or ball 38. The plunger cup 40 of the valve 26 is formed with a central deep well 42 surrounded by an annular relatively shallow annular shelf 44. The annular shelf receives the annular valve packing 46 of elastomeric material and which is adapted to seat on the seat 24 to form the valve seal.

Figure 3:
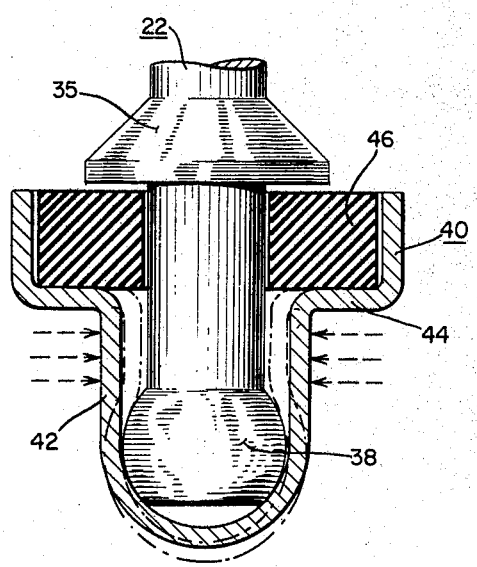
FIG. 3 is a sectional view showing schematically the necking-in of the plunger cup to provide the swivel mounting of a core embodying the invention.

In assembly, the ball 38 on the entering end of the pin 22, is received into the deep well 42. As shown in FIG. 3, the sidewall of the well is necked-in above the ball 38 to a diameter less than the diameter of the ball 38, thereby attaching the cup 40 to the pin 22. The necked-in portion of the sidewall of the well, however, has clearance with the pin shank and thereby permits swivel of the cup about the ball 38.

The swivel action of the cup permits accommodation of the packing 46 to the seat 24 to assure an effective seating and seal. The swivelling of the cup 40 on the pin 22 will permit a seal even if for some reason the plunger packing 46 is not seated in the bottom of the shelf 40 at all points, or even if for some reason the surfaces of the plunger packing are not parallel, or even if for some reason the seating surface of the plunger packing is not perpendicular to the axis of the packing.

Thus, swivel action of the cup 40 about the ball 38, coupled with the centering action of the guide washer 28 on the lower end of the pin 22, is especially effective in assuring a proper seating of the packing 46 on the seat 24. While seating improved over the prior art may be achieved by the use of either the guide washer 28 or the ball-swivel connection 38, 42 of the cup to the pin, in the preferred version both of these means are used to insure effective seating.

It should be noted that the guide means 28, 30 assures centralization of the lower end of the pin while affording improved air flow rates. Centralization of the upper end of the pin is achieved by the opening 20 on the bridge.

While the invention is shown in but one form, it is susceptible of a large number of variatioins. Therefore, the invention should be thought of as not limited by the above description but as having the scope of the appended claim language.

I claim:
1. A pneumatic tire valve core for insertion in a tire stem comprising:
    (a) a tubular barrel having a valve seat at one end thereof, and a screw portion at the other end thereof adapted to mate with the internal threads of such stem,
    (b) an annular resilient sleeve disposed on said barrel and adapted to seal the core in such stem,
    (c) a spring-biased valve pin disposed axially in said barrel having an enlarged rounded head disposed at the entering end of the valve,

(d) a plunger cup having a shallow annular shelf and a deep central well with a rounded bottom wall, the cup receiving said headed end, the side walls of the well portion being necked-in upward of the head portion of the pin to swivelly attach the cup to the pin, and (e) an annular resilient packing member disposed about the pin in the shallow shelf and adapted to valve off the stem when seated on the seat, whereby the swivel mounting of the plunger cup permits sealing engagement of the packing member on the seat despite slight non-parallelism of the face of the packing and the shelf.

2. A pneumatic tire valve core for insertion in a tire stem comprising:
(a) a tubular barrel having a valve seat at one end thereof, and a screw portion at the other end thereof adapted to mate with the internal threads of such stem;
(b) means to seal the core in such stem;
(c) a spring-biased valve pin disposed axially in said barrel having an enlarged rounded head disposed at the entering end of the valve;
(d) a plunger cup having a shallow annular shelf and a deep central well with a rounded bottom wall, the cup receiving said headed end, the side walls of the well portion being necked-in upward of the head portion of the pin to swivelly attach the cup to the pin; and
(e) an annular resilient packing member disposed about the pin in the shallow shelf and adapted to valve off the stem when seated on the seat, whereby the swivel mounting of the plunger cup permits sealing engagement of the packing member on the seat despite slight non-parallelism of the face of the packing and the shelf.

3. A valve core as described in claim 2 wherein guide means are provided for the lower end of the pin comprising an annular shoulder on the inside at the lower end of the barrel, the shoulder angling downward as the centerline of the barrel is approached and a central washer surrounding the pin and having legs extending outward and downward to engage the shoulder.

References Cited

UNITED STATES PATENTS

| | | | |
|---|---|---|---|
| 2,142,044 | 12/1938 | Broecker | 137—274.5 |
| 3,083,723 | 4/1963 | Duchin | 137—543 XR |
| 3,247,882 | 4/1966 | Pratt | 137—234.2 |
| 3,368,603 | 2/1968 | Kuzyn | 152—427 |
| 3,396,743 | 8/1968 | Mackal | 251—86 XR |
| 3,414,232 | 12/1968 | Hellman | 251—86 |

HAROLD W. WEAKLEY, Primary Examiner

U.S. Cl. X.R.

251—86; 137—541, 543